Jan. 6, 1931.   R. B. JORDAN   1,787,531
RESTRAINING DEVICE
Filed July 25, 1927

Ryland B. Jordan, INVENTOR

BY Victor J. Evans

WITNESS:

Patented Jan. 6, 1931

1,787,531

UNITED STATES PATENT OFFICE

RYLAND B. JORDAN, OF TYRO, VIRGINIA

RESTRAINING DEVICE

Application filed July 25, 1927. Serial No. 208,329.

My present invention has reference to an appliance for the leg of a fowl for preventing the fowl from assuming a sitting position and at the same time allowing free movement of the leg for scratching, walking and roosting.

The improvement primarily aims to provide a boot that may be constructed of any desired material of sufficient flexibility as to not injust the leg of the chicken, which may be readily attached to the chicken's leg or removed therefrom and which will serve to prevent a hen from setting and which will also obviate the possibility of the fowls jumping over the barn yard or poultry yard fences inasmuch as the device prevents the fowl from crouching.

A still further object is the provision of a device for this purpose that comprises a single sheet of suitable material designed to be wound around the leg of the fowl at the joint of the leg, and which has associated therewith tie or similar means for securing the ends together when in folded position so that the same cannot be accidentally removed.

Figure 1:
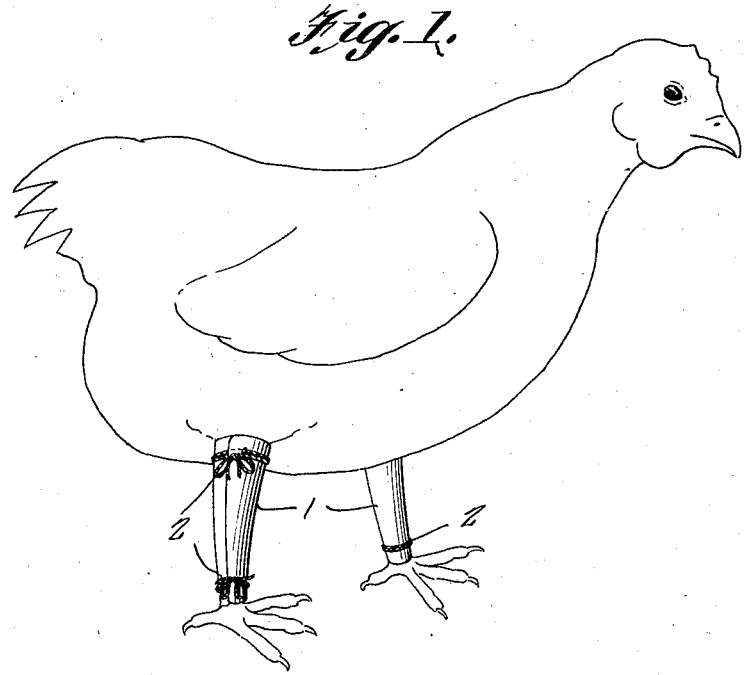
Figure 1 is a perspective view showing my device in applied position.
Figure 2:
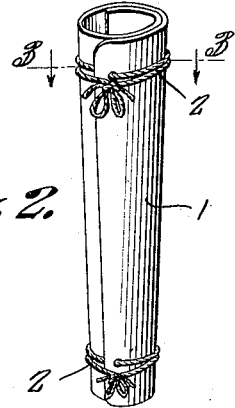
Figure 2 is a perspective view of the improvement.
Figure 3:
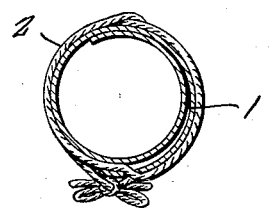
Figure 3 is a sectional view on the line 3—3 of Figure 2.

My improvement contemplates the employment of a single piece of suitable flexible material 1 which does not possess great resiliency but which is of a nature to prevent injury to the leg of the fowl when applied thereon. Two of such sheets may be employed and each of the said sheets is preferably tapered in plan. Threaded through the outer edge of the sheet at the top and the bottom thereof, there are cords 2. These cords are wound around the exterior of the sheet when the said sheet is wound around the leg of the fowl. Thereafter the cords are tied. When thus arranged upon the legs of the fowl, the leg joint of the said fowl is held from movement so that it is impossible for the fowl to crouch, but the improvement does not interfere with the walking of the fowl, her scratching or in anyways prevent the free eating, and drinking of the fowl. The boot is primarily devised to prevent hens from setting but may successfully be employed for preventing fowls from jumping over fences and the like. The simplicity of the construction and the advantages thereof will, it is thought, be understood and appreciated by those skilled in the art so that further detailed description will not be required.

As disclosed by the drawings the stiff sheet of flexible material, when wound around the leg of a fowl has one of its ends contacting with the foot of the fowl and its second end contacting with the body of the fowl at the joint of the thigh with the said body. Thus the device fully surrounds the entire leg of the fowl. Obviously one or both ends of the boot may be cut-away so that the improvement may be successfully employed on fowls having different length legs.

Having described the invention, I claim:—

A restraining device for fowls, comprising a sheet of stiff flexible material, designed to be wound around the leg of the fowl for the entire length of the fowl's leg to have one of its ends contact with the foot of the fowl and its other end contact with the body of the fowl at the juncture of the thigh therewith, said sheet having openings adjacent to its ends and cords passed through the openings, wound around the sheet and having their ends knotted to sustain the device upon the fowl.

In testimony whereof I affix my signature.

RYLAND B. JORDAN.